United States Patent [19]

Duri

[11] Patent Number: 5,237,844
[45] Date of Patent: Aug. 24, 1993

[54] DEVICE TO CONTROL THE TEMPERATURE OF EXTRUDED METALLIC SECTIONS DURING THE EXTRUSION STEP

[75] Inventor: Antonino Duri, Pradamano, Italy

[73] Assignee: Danieli & C. Officine Meccaniche Spa, Italy

[21] Appl. No.: 805,970

[22] Filed: Dec. 12, 1991

[30] Foreign Application Priority Data

Dec. 20, 1990 [IT] Italy .................. 83548 A/90

[51] Int. Cl.$^5$ .................. B21C 31/00; B21C 51/00
[52] U.S. Cl. .......................... 72/13; 72/37; 72/271; 250/338.3; 356/43; 374/124
[58] Field of Search ............... 72/13, 37, 253.1, 271; 250/334, 338.3, 347; 356/43, 44, 51; 358/113, 200; 359/827; 374/124, 130, 131, 133, 139

[56]  References Cited

U.S. PATENT DOCUMENTS

| | | | |
|---|---|---|---|
| 3,798,942 | 3/1974 | Bräckow | 72/13 |
| 4,040,563 | 8/1977 | Schairer | 250/347 |
| 4,481,418 | 11/1984 | Vanzetti et al. | 250/347 |
| 4,755,127 | 7/1988 | Becker | 356/51 |
| 4,799,787 | 1/1989 | Mason | 356/43 |
| 4,840,496 | 6/1989 | Elleman et al. | 374/124 |
| 4,846,554 | 7/1989 | Mori et al. | 359/827 |
| 5,145,257 | 9/1992 | Bryant et al. | 374/133 |

FOREIGN PATENT DOCUMENTS

| | | |
|---|---|---|
| 0076424 | 5/1982 | Japan .................. 374/124 |
| 547080 | 8/1942 | United Kingdom . |
| 728784 | 4/1955 | United Kingdom . |
| 1265671 | 3/1972 | United Kingdom . |
| 1431884 | 4/1976 | United Kingdom . |
| 1582889 | 1/1981 | United Kingdom . |

OTHER PUBLICATIONS

Mai et al., "Infra-Red Pyrometers with Particular Reference to Their Suitability for Use on Aluminum-Alloy Extrusion Presses", Z. Metallkde, vol. 66, No. 3, Mar. 1975, pp. 132-139.

*Primary Examiner*—Lowell A. Larson
*Assistant Examiner*—Thomas C. Schoeffler
*Attorney, Agent, or Firm*—Antonelli, Terry, Stout & Kraus

[57] ABSTRACT

Device (10) to control the temperature of extruded metallic sections during the step of extrusion from an extrusion press, the device being suitable for connection to, and for governing, a system that controls and regulates the extrusion speed, and being positioned in the vicinity of the outlet of the extruded product from the extrusion die and comprising a carriage (13) able to move circumferentially at least partly about the extruded product (12) on a plane substantially normal to the axis of the extruded product and bearing an optical-fiber (17) monitor (15) connected to a remotely located pyrometer (18).

6 Claims, 2 Drawing Sheets

DEVICE TO CONTROL THE TEMPERATURE OF EXTRUDED METALLIC SECTIONS DURING THE EXTRUSION STEP

BACKGROUND OF THE INVENTION

This invention concerns a device to control the temperature of extruded metallic sections during the extrusion step.

The purpose of the device according to the invention is to monitor the temperature of sections leaving an extrusion press so as to regulate the speed of extrusion according to the temperature of the extruded product, thus enabling an "isothermal extrusion" to be achieved with a constant temperature of the extruded aluminium product by varying the extrusion speed of the press.

The accomplishment of an isothermal extrusion provides advantages as regards shorter extrusion times and better product quality.

So as to understand these facts it is enough to see in FIG. 1 a typical graph of the temperature curve of an average aluminium section produced with a constant extrusion speed of 30 meters per minute.

The graph shows that the highest temperature reached by the extruded aluminium product is 540° C. when starting from a minimum temperature of 410° C.

The value of 540° C. represents the highest temperature which the extruded section should reach since the occurrence of micro surface defects begins above that threshold.

To avoid this occurrence, the speed of the press is regulated in such a way that this temperature is never exceeded.

If on the contrary it is desired to obtain a constant temperature on the extruded product (see FIG. 2), the speed of the press should be varied on the basis of a decreasing speed curve as compared to a constant speed.

A comparison of the two graphs shows that in the latter case the speed of extrusion is optimized, allowing this speed to be increased considerably, above all in the first part of the extrusion process when the temperature of the section is lower.

This enables the average extrusion time to be reduced by a value of the order of 10-20%, depending on the type of the extruded product.

Moreover, extrusion at a constant temperature makes possible a more accurate assessment of the effects of thermal expansion on the cross section of the extruded product precisely because this parameter remains constant along the whole length of the section and therefore enables an exact calculation of the suitable compensation to be carried out.

The above results in a higher product quality.

The present applicant is aware of attempts to govern the extrusion speed by the temperature of the extruded product, but the systems known so far do not enable accurate information to be obtained in view of the reflectance factor of the surface of extruded products, the reflectance being even greater in the case of aluminium or brass.

For this reason the known systems are still generally in the trial stage and do not yield the results hoped for, so that a correct correlation between the extruded temperature and the extrusion speed has still not been achieved industrially.

The contents of document GB-A-547,080 of 1942 are known, wherein a thermocouple is stationarily positioned in a circumferential position on a extruded product near the die. This document discloses monitoring the temperature of the extruded material only at one or more stationary or circumferential positions and depends on a design choice, but it cannot be adapted case by case to the working requirements of the product or of the various products, especially in the case of complex sections such as those of window or door frames.

Document GB-A-1,582,889 of 1978 teaches the use of a pyrometer which is scanned through a pre-determined angle across the path of a body. This system was designed for a rolling cycle and has the purpose substantially of monitoring the temperature of flat surfaces without any complexities of profile. Moreover, this document does not envisage the possibility of monitoring situations of a local temperature nor does it provide for monitoring the temperature in real time and of using this information in real time to govern the instantaneous rolling speed. The teaching of this document cannot be transferred to extrusion presses which extrude complex sections with varied sections such as sections for window or door frames, for instance.

SUMMARY OF THE INVENTION

The present invention tends to overcome the shortcomings of the state of the art and to provide a device that enables reliable information to be obtained regarding any type of extruded product.

According to the invention the temperature control device monitors the temperature by means of an infrared optical pyrometer equipped with an optical fiber.

The optical pyrometer is moved along a defined path, so that it can control the temperature of a section along a plane normal to the extrusion axis.

The system is based on the principle that a body emits an intensity of radiation on the infrared wave length in proportion to its temperature.

A sensor reads the intensity of infrared radiation and converts it into an electrical signal which is then suitably filtered and amplified.

A high-selectivity optical interference filter positioned downstream of the optical pyrometer and suitably set for the type of material to be monitored filters all the undesired wave lengths and lets only the significant wave length pass through towards the sensor.

Where, for instance, the material to be monitored is aluminium or an alloy thereof, the system is pre-arranged to operate in the zone of the infrared mean, namely at about 1.5 microns.

The optical fiber with which the system is equipped enables the sensor and electronic amplification means to be decentralized from the monitoring zone so as to avoid damage to the apparatus by high temperatures, and in this way there is also less overall bulk of equipment in the monitoring zone.

The optical focusing system is incorporated at the end of the optical fiber and enables an area to be controlled which may amount to about 8 mm. at a distance of about 150 mm.

The size of this area may vary, depending on the extruded product, the speed of extrusion and other factors which affect the monitoring and the quality thereof.

The optical fiber and the lenses are made of very low-attenuation optical glass.

The sensor employed will provide advantageously very fast response times, and this feature is very important since it makes possible very short scanning times.

The response time will advantageously be about 3 meters per second, but this time depends on the extrusion speed.

Moreover, the maximum repeatability error of the sensor is to be found within very small values, advantageously within +/−0.2%.

However, the use of the pyrometer by itself is not enough to assess accurately the temperature of the extruded product since this temperature varies considerably according to the point on the cross section of the section where the measurement is taken.

In fact, it has been found that in the zones where the section has a cross section of a complex shape the temperature is higher, and the differences as compared to flat cross sections may reach 50° C. or more, this being due to local increases of the temperature of the section. It is therefore clear that the measurement of the temperature should be carried out on the hottest zones.

Since an extruded product may have a great variety of shapes and cross sections, the invention provides a scanning system which chooses automatically the zone of the section having the greatest thermal emissivity.

According to the invention the device is also suitable to concentrate on the hottest zone of a section being extruded so as to carry out a continuous accurate control of the temperature of the product. This enables the extrusion speed to be governed by the maximum temperature found locally on the section being extruded, thus maintaining the maximum possible speed and controlling and adjusting that speed continuously in real time.

The scanning system consists of a double movement determined by two high-resolution step motors.

The first movement acts directly on the measurement and makes the focusing lens carry out an angular oscillation of a desired value, for instance +/−20°, with a desired width which may be about 100 mm. for instance.

According to a variant the first movement can be linear.

The scanning is actuated during the whole extrusion step, and the highest temperature value in each cycle is stored and used as a regulating parameter;

A great number of measurements are taken in each half period of scanning. The response time of the system is 90 meters per second with about thirty measurements per half period.

The second movement permits a circular rotation of at least 120° of the whole measurement system, including the first movement, about the outlet of the extruded product from the press.

According to a variant the system can rotate even up to 360° or can rotate by a continuous circle.

This second scanning is actuated advantageously only once at the beginning of each production step and has the purpose of seeking automatically, on the basis of an appropriate self-learning program, the most efficient angular positioning from which to measure the temperature of the extruded product.

The whole self-learning procedure is organized to last for a short time but advantageously not longer than about 5 seconds.

The measurement system and scanning system are enclosed in an appropriate metallic container provided for application substantially to the outlet of the press.

DETAILED DESCRIPTION OF THE PREFERRED EMBODIMENTS

Figure 1:
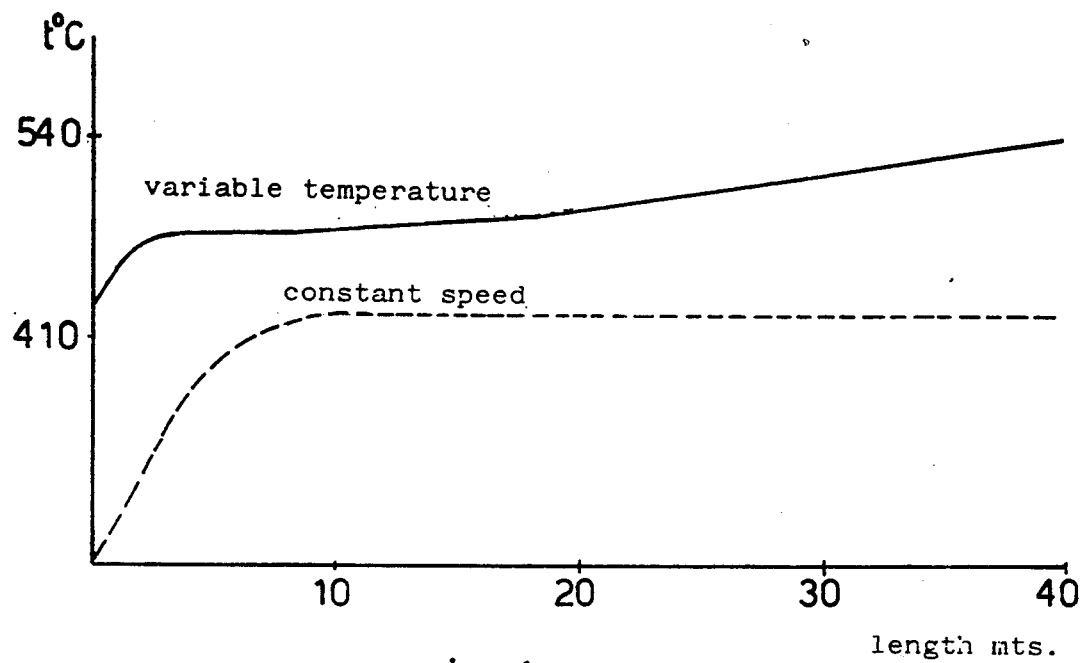
FIG. 1 is a graph of the temperature curve of an average aluminum section produced with a constant extrusion speed of 30 meters per minute.
Figure 2:
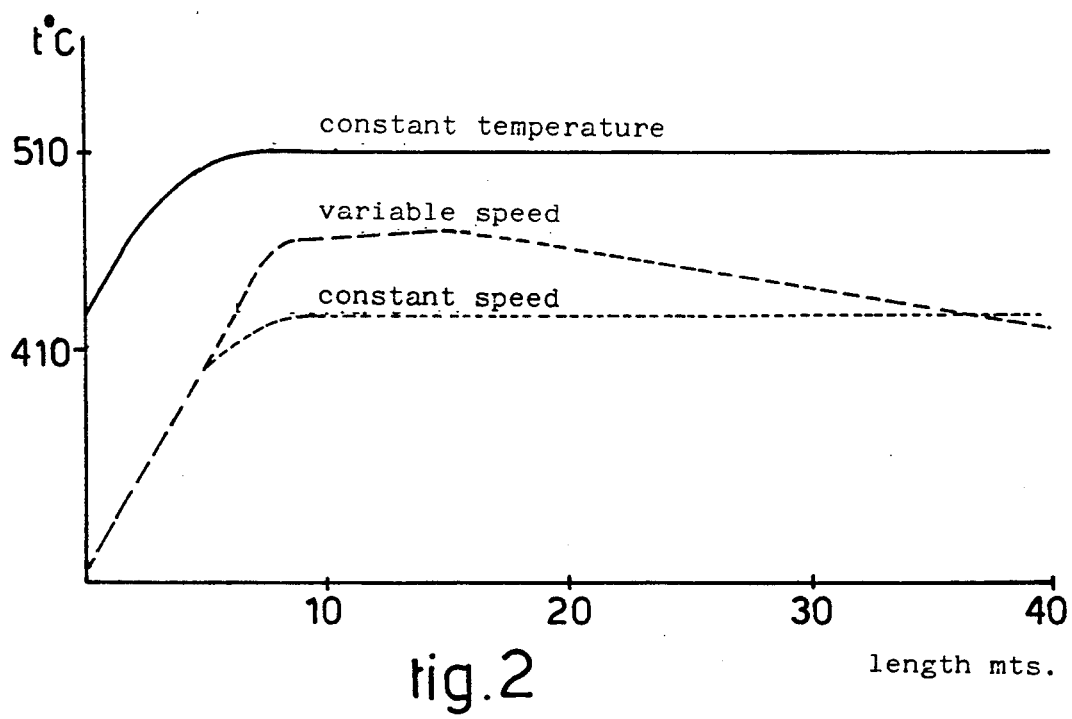
FIG. 2 is a graph of the temperature curve of an average aluminum section produced with a variable extrusion speed to obtain a constant temperature; and, FIG. 3 is a schematic diagram of the control device.
Figure 3:
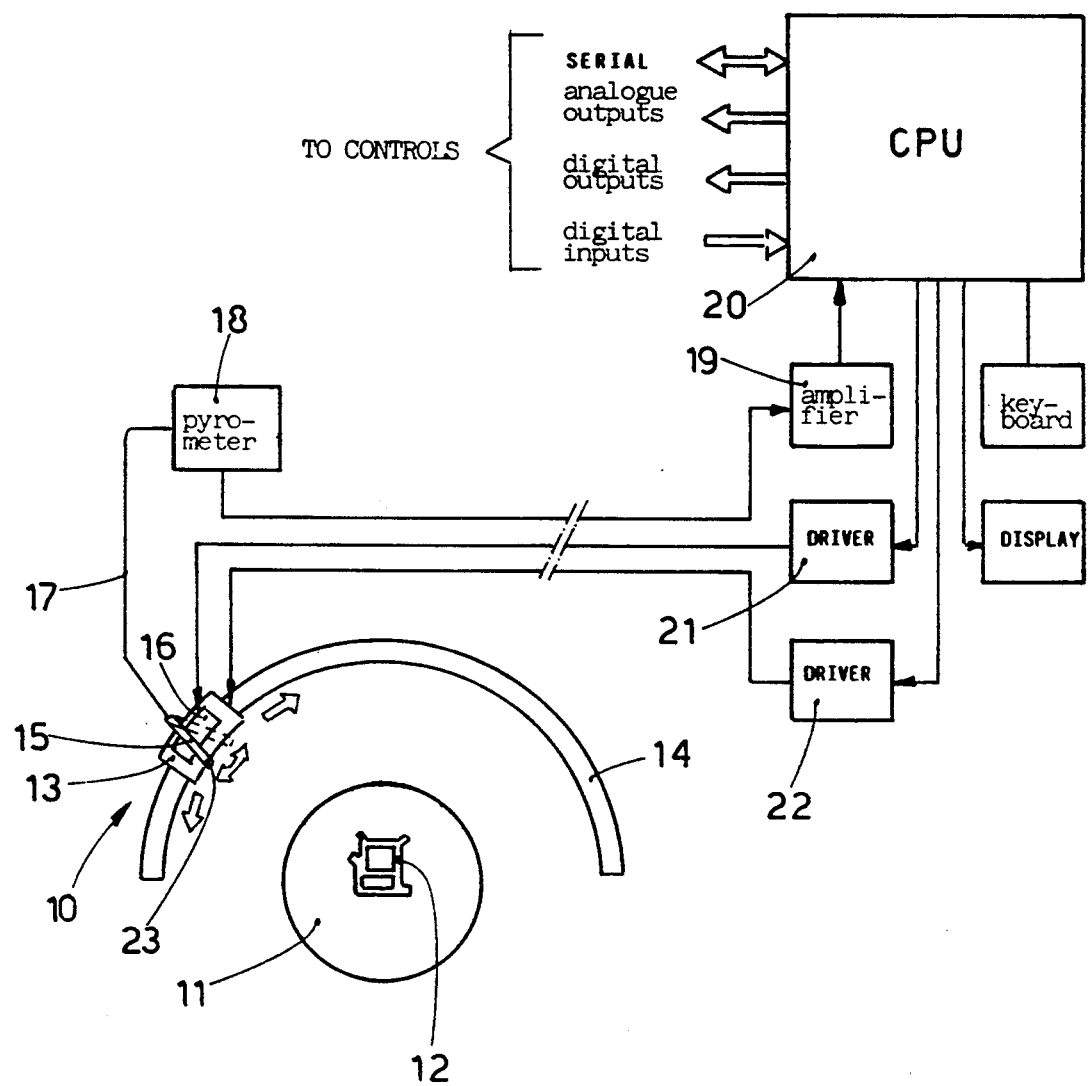

Let us now see a preferred embodiment shown as an example in the attached FIG. 3, in which a device 10 cooperates with an outlet 11 from a press for an extruded product 12 of any shape and type. The product 12 may consist of aluminium, copper, brass or another material.

In this example the device 10 can rotate about the outlet 11 by 180° since a runway 14 is provided which permits that angle.

According to a variant the runway 14 is substantially straight.

The device 10 according to the invention comprises a carriage 13 which can move along the runaway 14 according to actuations sent to the carriage 13 by a central processor unit CPU 20 through a specific first motor 22.

A monitor 15 is located on the carriage 13 and bears at its end a lens 23, which is of a replaceable type. In this example the monitor 15 is moved at an angle in a pendulating manner by a pendulation assembly 16 governed by a second motor 21.

The monitor 15 can also move straight or at an angle but will keep the same orientation in relation to the extruded product 12 or to the center of rotation of the runaway 14.

The monitor 15 is connected to a remotely located pyrometer 18 by an optical fiber. The pyrometer 18 transmits signals received to an amplifier 19, which in turn sends them to the central processor unit CPU 20.

The central processor unit CPU 20 governs the systems which regulate the speed of extrusion.

I claim:

1. Device to control a temperature of an extruded product during a step of extrusion from an extrusion die of an extrusion press, the device being suitable for connection to, and for governing, a system that controls and regulates extrusion speed, and being characterized in that the device is positioned in a vicinity of an outlet of the extruded product from the extrusion die and comprises a carriage able to move circumferentially at least partly about the extruded product on a plane substantially normal to an axis of the extruded product and bearing an optical-fiber monitor connected to remotely located pyrometer.

2. Device as claimed in claim 1, in which the monitor located on the carriage is movable in a pendulating manner in a direction substantially transverse to the axis of the extruded product.

3. Device as claimed in claim 2, in which the monitor located on the carriage is movable substantially in a linear manner in a direction substantially transverse to the axis of the extruded product.

4. Device as claimed in claim 1 in which the movement of the carriage is linear.

5. Device as claimed in claim 1 in which the movement of the carriage is circular by at leas 120°.

6. Device as claimed in claim 1 in which the monitor comprises at its front end a replaceable lens.

* * * * *